(12) United States Patent
Copenhaver

(10) Patent No.: US 11,040,261 B1
(45) Date of Patent: Jun. 22, 2021

(54) SYSTEM FOR TURNING A STEER ROPING PRACTICE APPARATUS

(71) Applicant: Alan R. Copenhaver, Hinton, IA (US)

(72) Inventor: Alan R. Copenhaver, Hinton, IA (US)

( * ) Notice: Subject to any disclaimer, the term of this patent is extended or adjusted under 35 U.S.C. 154(b) by 0 days.

(21) Appl. No.: 16/102,973

(22) Filed: Aug. 14, 2018

(51) Int. Cl.
*A63B 69/00* (2006.01)
*A01K 15/00* (2006.01)

(52) U.S. Cl.
CPC ........ *A63B 69/0068* (2013.01); *A01K 15/003* (2013.01)

(58) Field of Classification Search
CPC ....... A63B 69/0068; F41J 9/02; A01B 69/002
USPC .................................................. 273/366–368
See application file for complete search history.

(56) References Cited

U.S. PATENT DOCUMENTS

| | | |
|---|---|---|
| 3,066,939 A | 12/1962 | Sprout |
| 3,706,153 A * | 12/1972 | Folson ................... A63H 30/00 446/451 |
| 3,776,553 A | 12/1973 | Kelton |
| 3,802,706 A | 4/1974 | Hamm |
| 4,266,779 A | 5/1981 | English |
| 4,364,570 A | 12/1982 | Hallam |
| 4,451,045 A | 5/1984 | Fesmire |
| 4,662,642 A | 5/1987 | Archibald |
| 4,815,735 A * | 3/1989 | McClenny ......... A63B 69/0091 473/427 |
| 4,874,179 A | 10/1989 | Henderson |
| 4,960,076 A | 10/1990 | Snorgrass |
| 4,981,302 A | 1/1991 | Narramore |
| 4,995,618 A | 2/1991 | Panzner |
| 5,009,432 A | 4/1991 | Richard |
| 5,080,373 A | 1/1992 | Jones |
| 5,568,926 A | 10/1996 | Kaptein |
| 5,709,386 A | 1/1998 | Nelson |
| 6,497,411 B1 | 12/2002 | Nelson |
| 6,736,399 B1 | 5/2004 | Copenhaver |
| 6,945,534 B1 | 9/2005 | Lindsey |
| 7,059,605 B1 | 6/2006 | Hughes |

(Continued)

FOREIGN PATENT DOCUMENTS

CA 2187825 4/1998

OTHER PUBLICATIONS

GP Manufacturing, LLC, "Speed Roper & Speed Header" website, product information, Jan. 8, 2007, 10 pages, www.teamroper.com/speed.

*Primary Examiner* — Laura Davison
(74) *Attorney, Agent, or Firm* — Jeffrey A. Proehl; Woods, Fuller, Shultz & Smith, P.C.

(57) ABSTRACT

A system for practicing roping of a steer may include a towing apparatus configured to tow a steer roping practice apparatus across a ground surface, a central anchor device configured to define a fixed anchor point with respect to the ground surface, an elongated guide member attachable at a first end to the central anchor device and attachable at a second end to the towing apparatus to guide the towing apparatus along a circular path about the central anchor device, and a turning device configured to engage the elongated guide member between the central anchor device and the towing apparatus in a manner causing the towing apparatus to make a turn on the ground surface from the circular path. The system may also include a mechanical steer roping practice apparatus movable across the ground surface and removably hitched to the towing apparatus.

18 Claims, 10 Drawing Sheets

(56) References Cited

U.S. PATENT DOCUMENTS

| | | |
|---|---|---|
| 7,293,775 B1 | 11/2007 | Donnelly |
| 7,430,990 B1 | 10/2008 | Copenhaver |
| 7,469,902 B1 * | 12/2008 | Hale .......................... F41J 9/02 |
| | | 273/359 |
| 8,297,980 B2 | 10/2012 | Reynolds |
| 8,783,689 B1 | 7/2014 | Copenhaver |
| 9,533,209 B1 | 1/2017 | Copenhaver |
| 9,597,572 B1 * | 3/2017 | Copenhaver ....... A63B 69/0068 |
| 9,808,695 B1 | 11/2017 | Copenhaver |
| 2004/0101811 A1 | 5/2004 | Gipson |
| 2006/0170163 A1 | 8/2006 | Perkins |
| 2015/0145210 A1 * | 5/2015 | Bundy ............... A63B 69/0068 |
| | | 273/359 |

* cited by examiner

US 11,040,261 B1

SYSTEM FOR TURNING A STEER ROPING PRACTICE APPARATUS

BACKGROUND

Field

The present disclosure relates to steer roping practice apparatus and more particularly pertains to a new system for turning a steer roping practice apparatus to provide a better simulation of the movements of a steer during a roping competition.

SUMMARY

In one aspect, the present disclosure relates to a system for practicing roping of a steer which may comprise a towing apparatus configured to tow a steer roping practice apparatus across a ground surface, a central anchor device configured to define a fixed anchor point with respect to the ground surface, an elongated guide member attachable at a first end to the central anchor device and attachable at a second end to the towing apparatus to guide the towing apparatus along a circular path about the central anchor device, and a turning device configured to engage the elongated guide member between the central anchor device and the towing apparatus in a manner causing the towing apparatus to make a turn on the ground surface from the circular path.

In another aspect, the disclosure relates to a system for practicing roping of a steer which may comprise a mechanical steer roping practice apparatus movable across a ground surface and a towing apparatus configured to tow a steer roping practice apparatus across the ground surface, with the steer roping practice apparatus being removably hitched to the towing apparatus. The towing apparatus may comprise a frame having an attachment point, at least a pair of wheels rotatably mounted on the frame, and a motor mounted on the frame and connected to the wheels to produce rotation of the wheels and movement of the towing apparatus across the ground surface. The system may further comprise a central anchor device configured to define a fixed anchor point with respect to the ground surface, a flexible elongated guide member attachable at a first end to the central anchor device and attachable at a second end to the attachment point on the towing apparatus to guide the towing apparatus along a circular path about the central anchor device, and a turning device configured to engage the elongated guide member between the central anchor device and the towing apparatus in a manner causing the towing apparatus to make a turn on the ground surface from the circular path.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
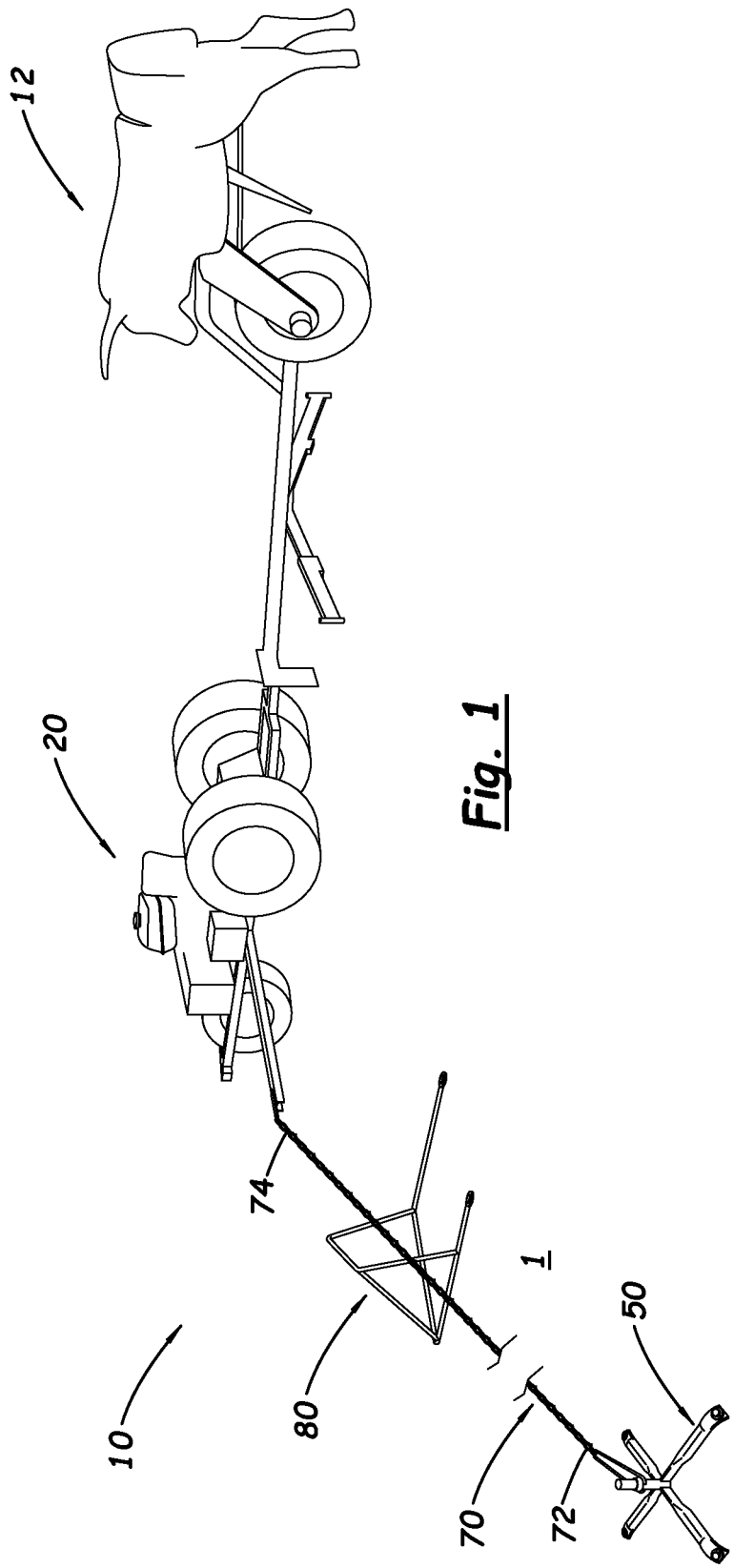
FIG. 1 is a schematic perspective view of a new system for turning a steer roping practice apparatus according to the present disclosure.
Figure 2:
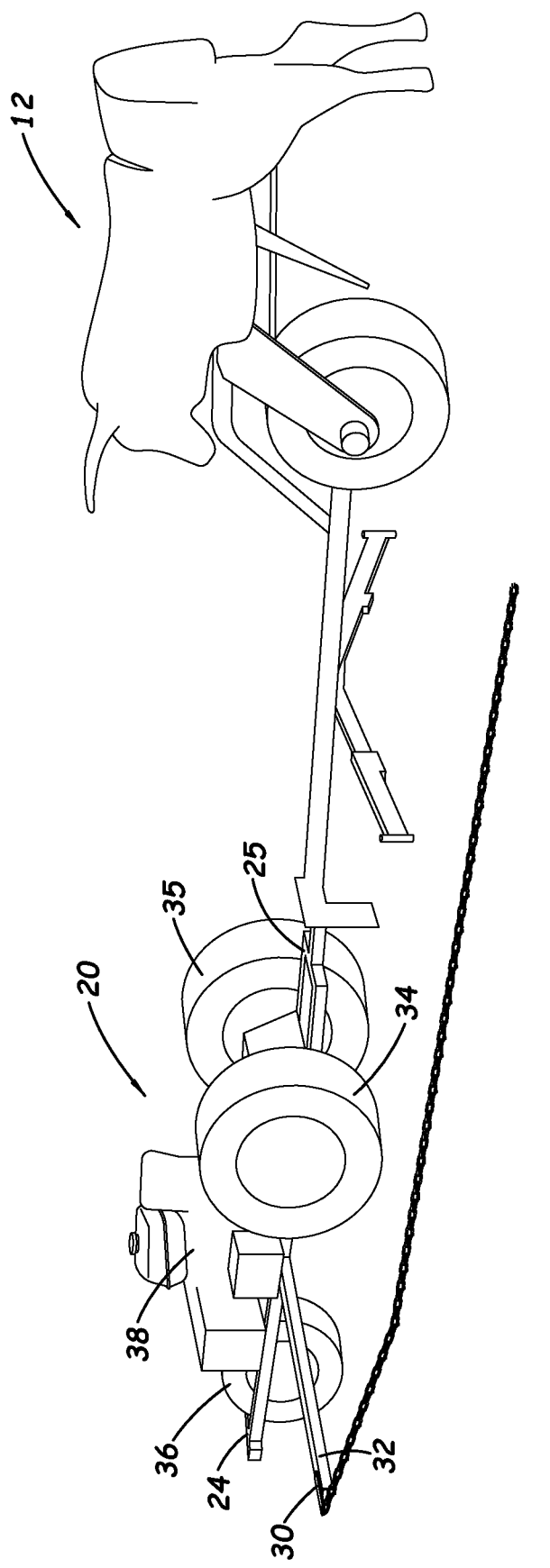
FIG. 2 is a schematic perspective view of the towing apparatus and steer roping practice apparatus of the system, according to an illustrative embodiment.
Figure 3:
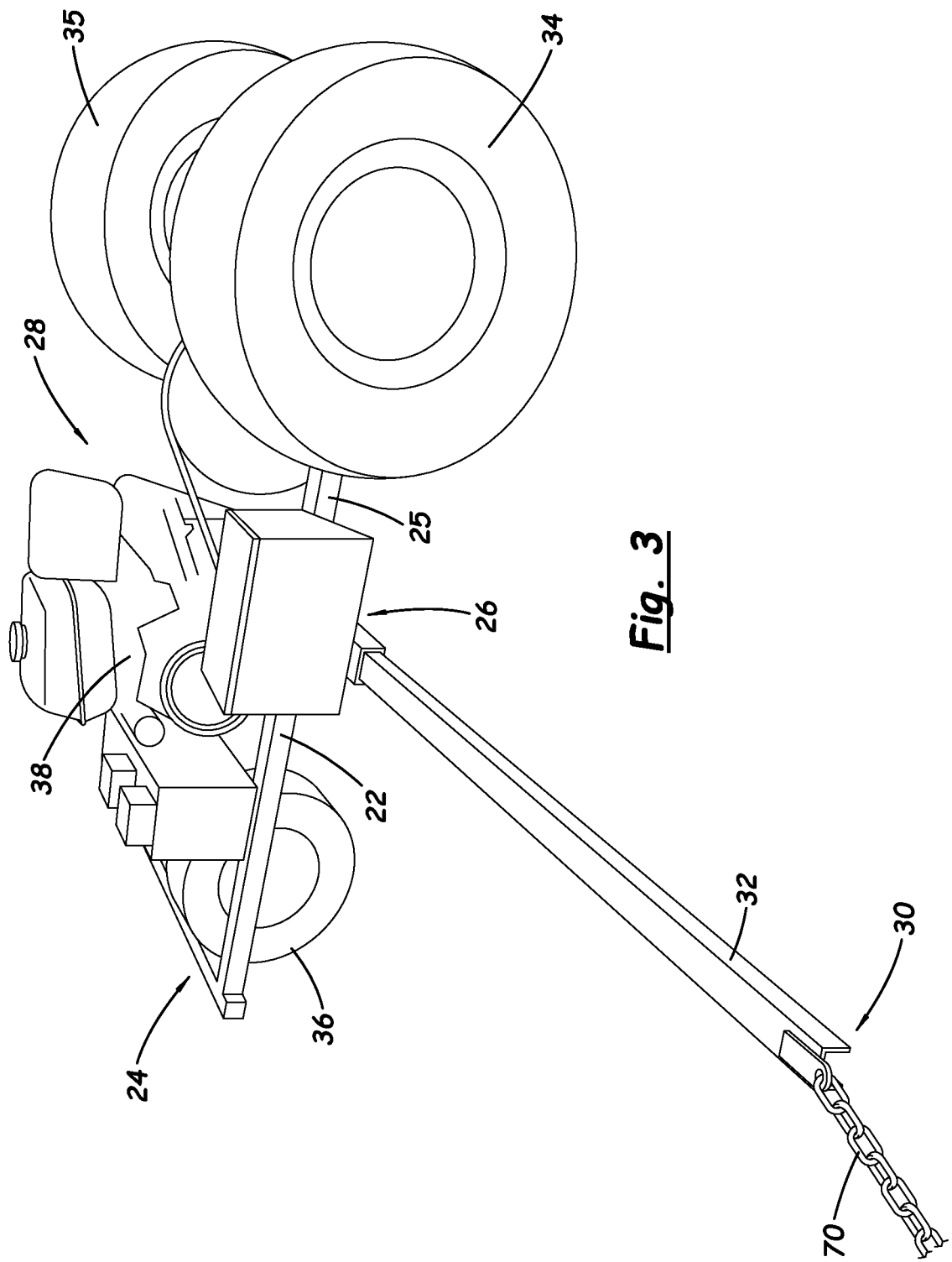
FIG. 3 is a schematic perspective view of the towing apparatus of the system, according to an illustrative embodiment.
Figure 4:
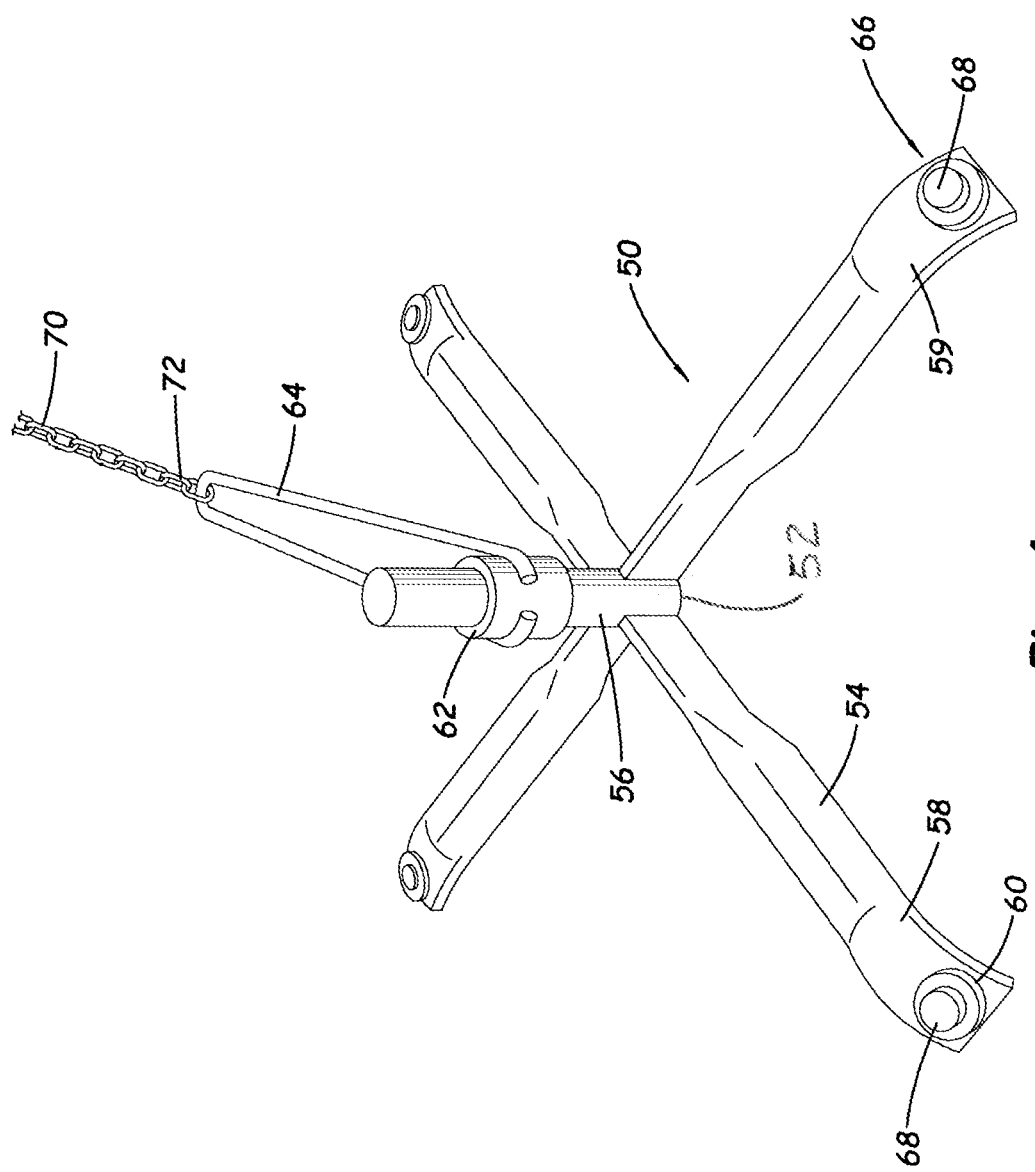
FIG. 4 is a schematic perspective view of the central anchor device of the system, according to an illustrative embodiment.
Figure 5:
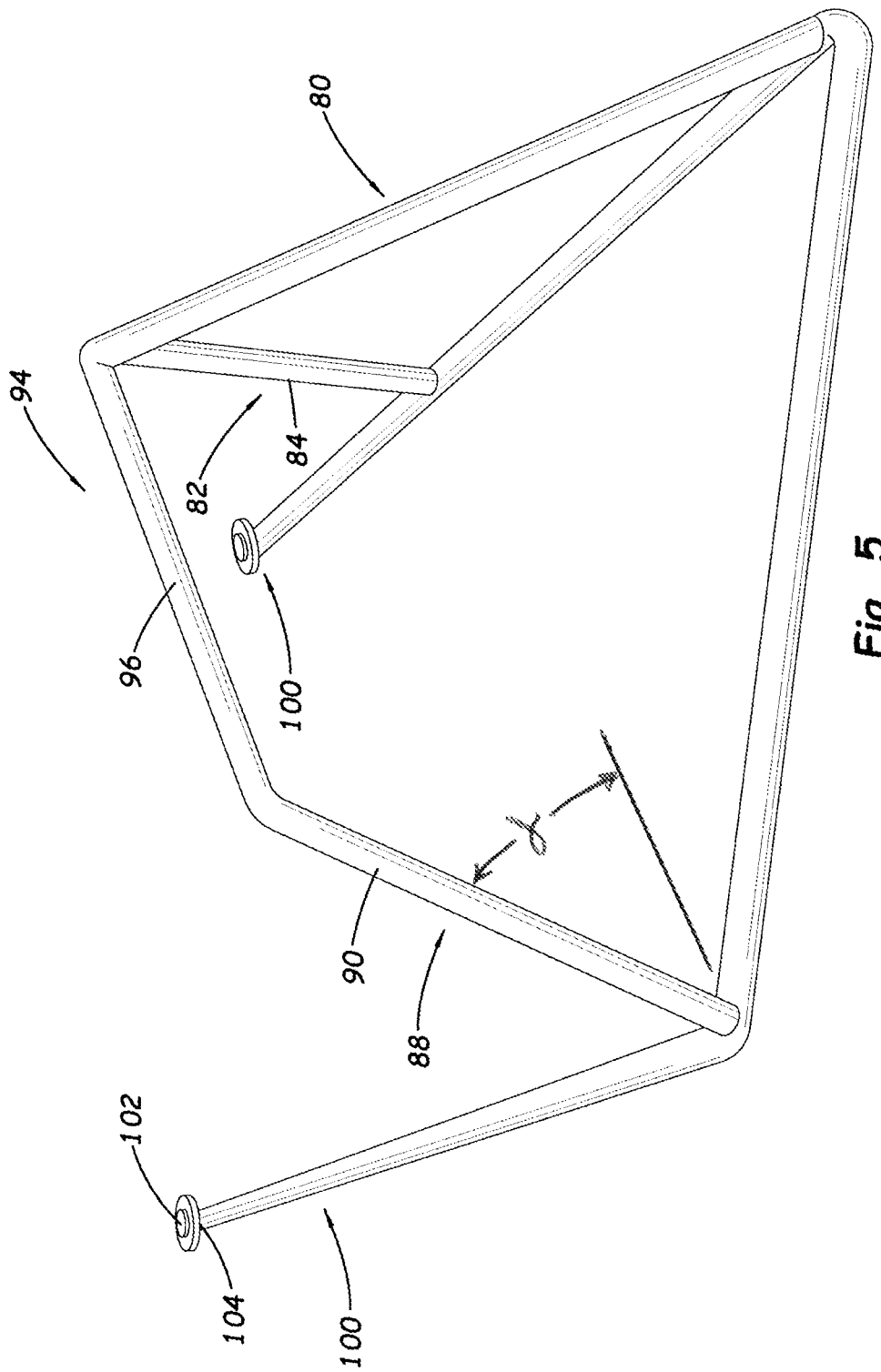
FIG. 5 is a schematic perspective view of the turning device of the system, according to an illustrative embodiment.
Figure 6:
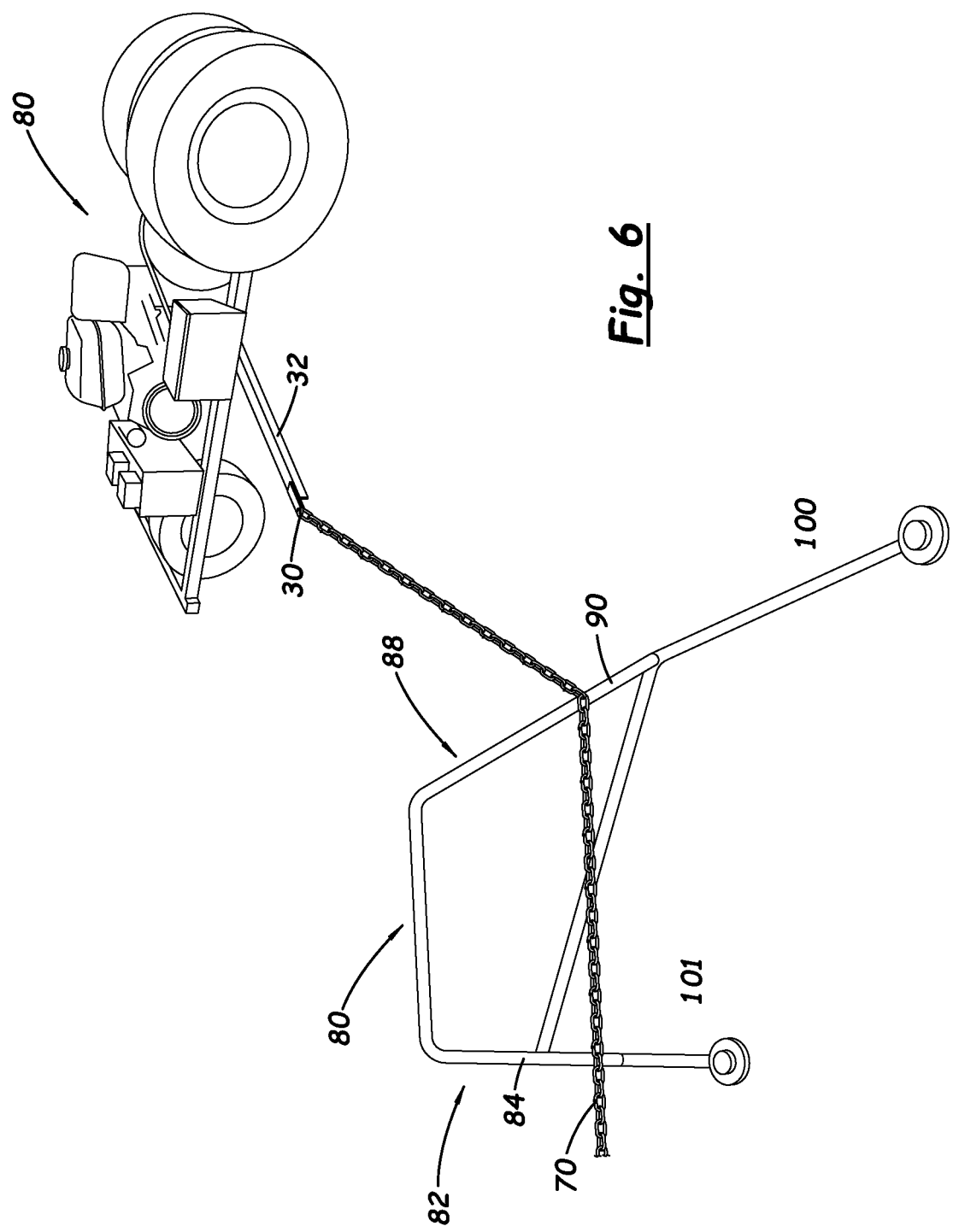
FIG. 6 is a schematic perspective view of the system showing the elongated guide member engaging the turning device of the system, according to an illustrative embodiment.
Figure 7:
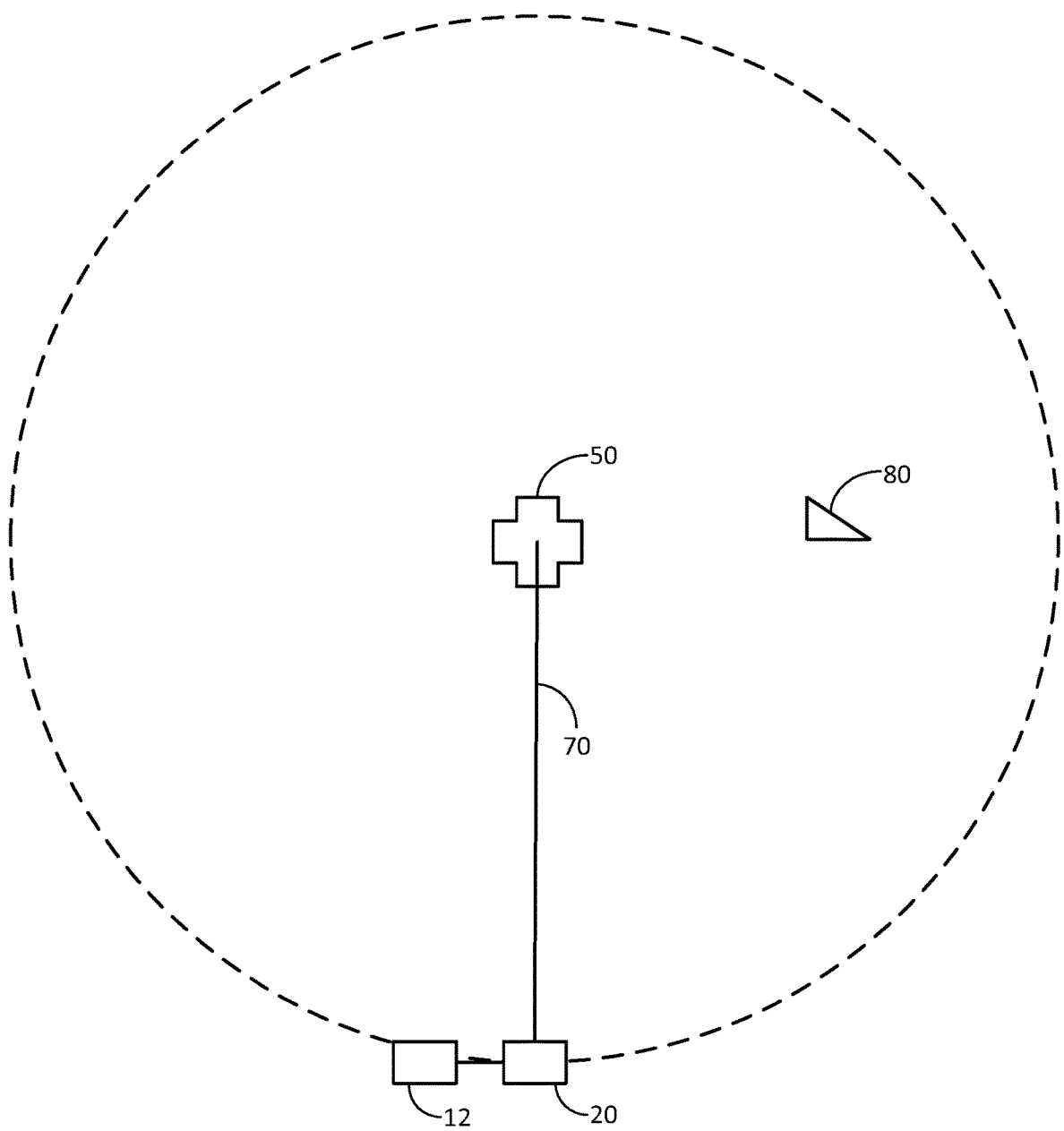
FIG. 7 is a schematic diagram of the system showing the towing apparatus and practice apparatus moving along a circular path about the central anchor device prior to engaging the turning device, according to an illustrative implementation of the system.
Figure 8:
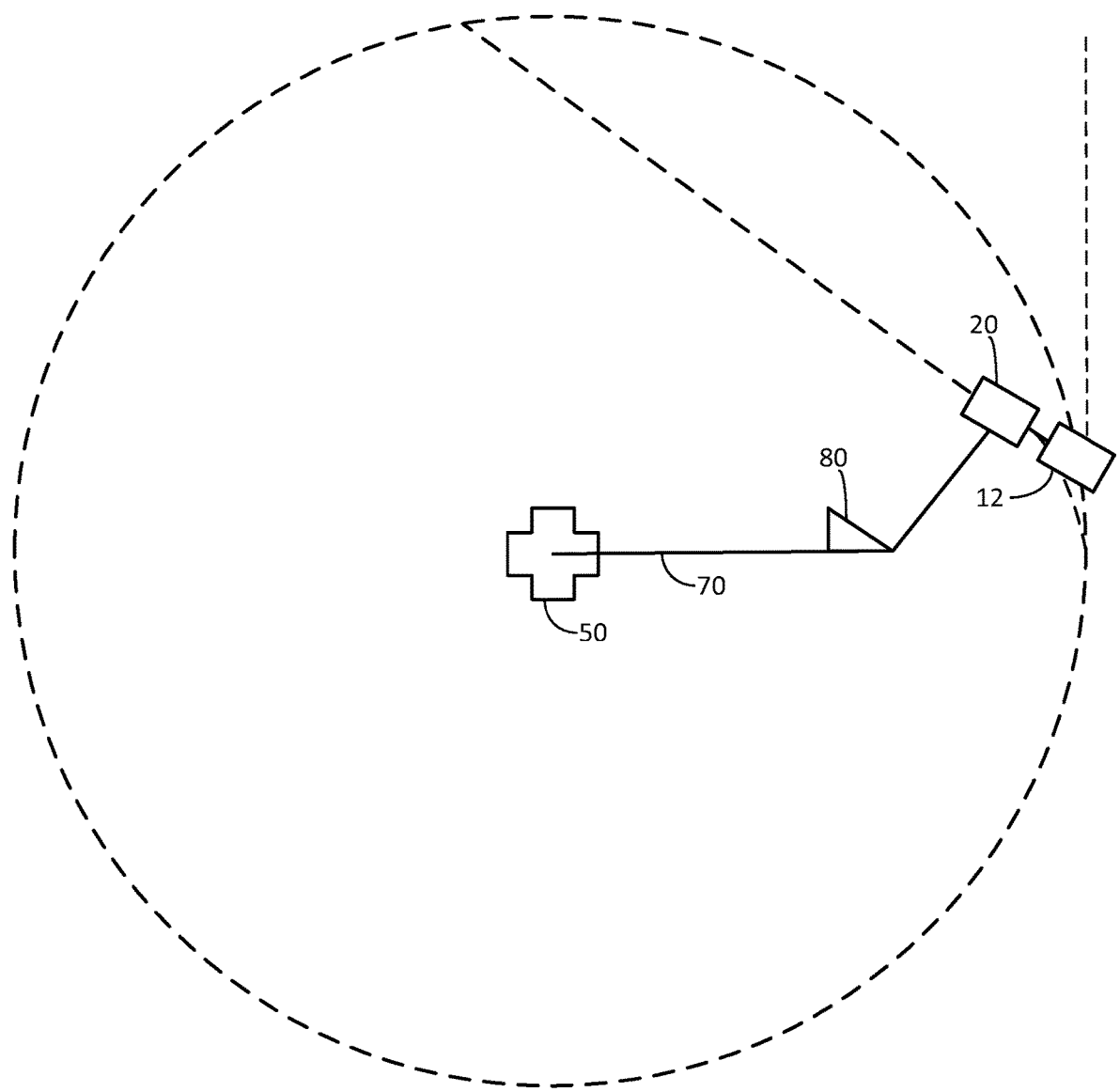
FIG. 8 is a schematic diagram of the system showing the towing apparatus and practice apparatus as the elongated guide member engages the turning device causing the towing apparatus and practice apparatus to turn from the circular path, according to an illustrative implementation of the system.
Figure 9:
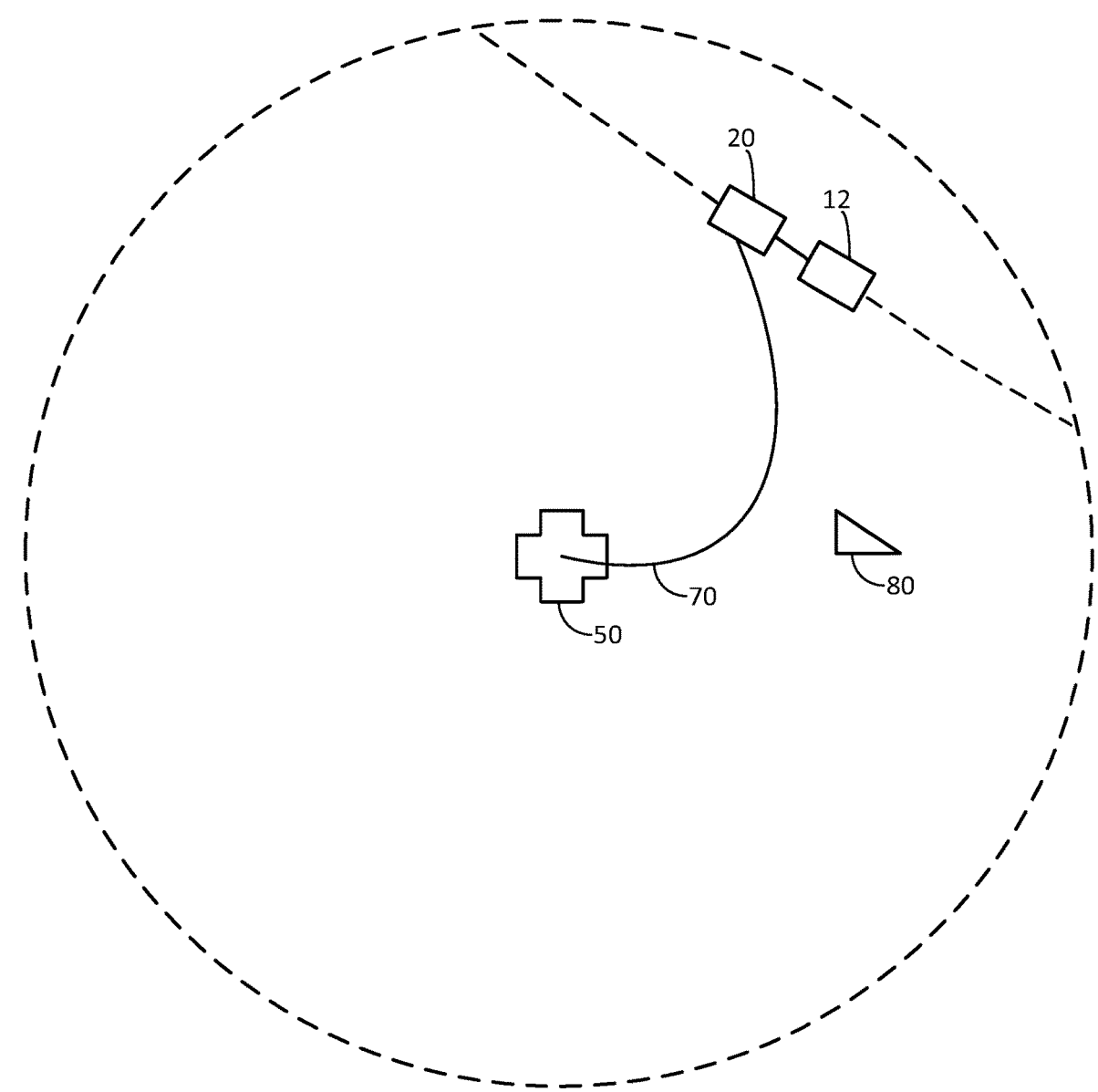
FIG. 9 is a schematic diagram of the system showing the towing apparatus and practice apparatus continuing to move along a substantially straight path after the elongated guide member disengages from the turning device before returning to the circular path, according to an illustrative implementation of the system.
Figure 10:
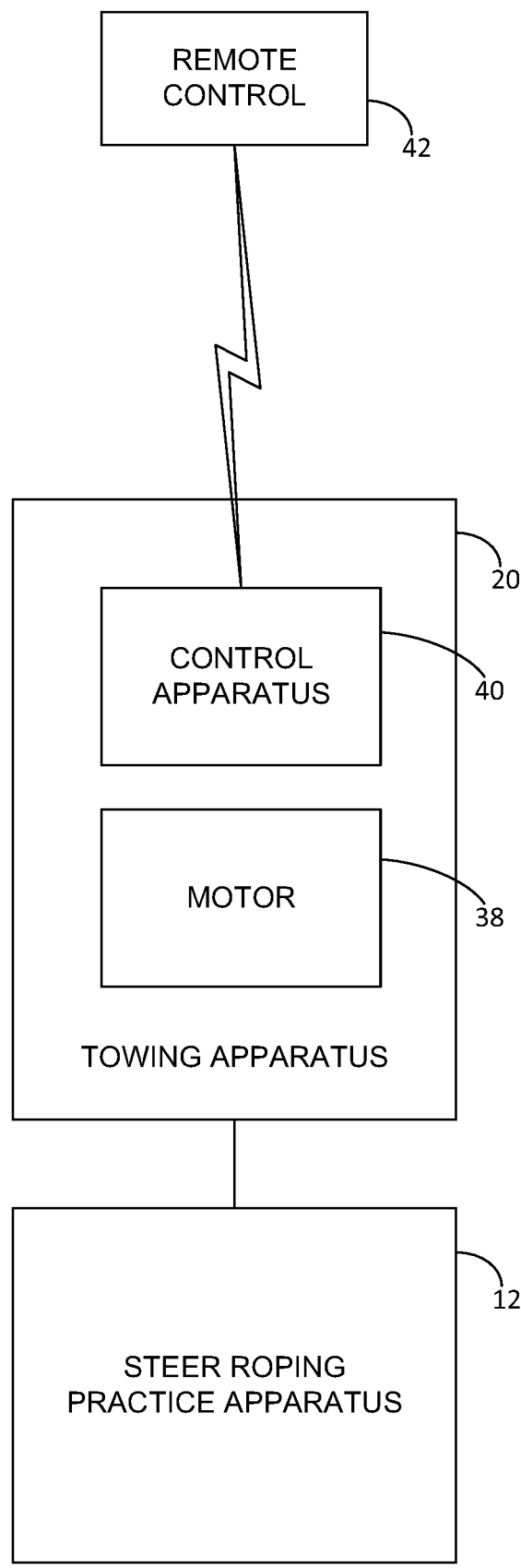
FIG. 10 is a schematic diagram of elements of the system, according to an illustrative embodiment

With reference now to the drawings, and in particular to FIGS. 1 through 10 thereof, a new system for turning a steer roping practice apparatus embodying the principles and concepts of the disclosed subject matter will be described.

The applicant has recognized the advantages of producing a realistic steer roping practice apparatus for the participants of competitive team steer roping competitions. The applicant has developed several improvements in the movements of elements of roping practice apparatus to enhance the simulation of a real steer by the mechanical steer roping practice apparatus which are disclosed, for example, in U.S. Pat. Nos. 6,736,399; 7,430,990; 8,783,689; 9,533,209; 9,597,572; and 9,808,695, all of which are hereby incorporated by reference in their entireties.

While these innovations tend to focus on realism in the movement of elements of the practice apparatus itself, the applicant has also recognized that realism in the movement of the practice apparatus across the ground surface is also desirable. The applicant also believes that the turning movement of a steer during team roping has not been simulated in a roping practice apparatus in a satisfactorily realistic manner.

The applicant has thus developed a system which may be utilized with a variety of steer roping practice apparatus to cause the apparatus to execute a turn or corner to enhance the realism of the apparatus movement across the ground surface. The system may also provide the user with the ability to utilize a steer roping practice apparatus without requiring another person to operate a vehicle, such as an all-terrain vehicle (ATV), to tow the practice apparatus across the ground surface while the user practices roping the roping practice apparatus.

In one aspect, the disclosure relates to a system 10 for practicing roping of a steer utilizing a mechanical steer roping practice apparatus 12 which is movable over the ground surface 1 and may be generally configured to simulate at least one aspect of a steer, such as leg movement, body movement, head movement etc. Some suitable examples of practice apparatus are disclosed in the patents which are incorporated into this disclosure by reference.

The system 10 may also include a towing apparatus 20 which may be configured to tow the roping practice apparatus 12 across the ground surface 1. The practice apparatus 20 may be hitchable or otherwise connectable to the towing apparatus to permit the practice apparatus 12 to be pulled across the ground surface by the towing apparatus. In an illustrative embodiment of the towing apparatus 20, a frame 22 may be utilized on the apparatus which has a front 24 and a rear 25 with a length of the frame generally defined between the front 24 and rear 25. The front 24 of the frame may be generally oriented in the normal direction of movement of the apparatus and the rear 25 may be oriented away from the normal direction of movement. The frame 22 may also have an inboard side 26 and an outboard side 28 with a width of the frame generally being defined between the inboard and outboard sides. The frame 22 may have an attachment point 30, and in some embodiments the attachment point 30 may be located on an attachment arm 32 which extends from the frame on the inboard side 26. The attachment point, and the attachment arm when utilized, may generally be located between the front 24 and the rear 25 of the frame, and may be located generally closer to the front than the rear. The attachment point may also be located at a position that is spaced away from the inboard side of the frame by the arm 32.

The towing apparatus 20 may also include at least a pair of wheels which are rotatably mounted on the frame to facilitate movement of the frame over the ground surface. Illustratively, the plurality of wheels includes three wheels with a pair 34, 35 of the wheels being located toward the rear 25 of the frame and a single front wheel 36 being located toward the front 24 of the frame. In illustrative embodiments, the front wheel 36 is not steerable, although steering of the front wheel could be incorporated in some embodiments. The towing apparatus 20 may also include a motor 38 which is mounted on the frame 22 and is connected to the wheels to cause the wheels to rotate and move the towing apparatus forwardly. In the illustrative embodiments, the motor is suitably connected to the rear wheels 34, 35 using any suitable power transfer means, such as chains, belts, gears or shafts. The towing apparatus 20 may also include a control apparatus 40 which may be mounted on the frame and configured to control operation of the towing apparatus, and in particular the motor 38. A remote control 42 may wirelessly transmit commands to the control apparatus 40 to control operation of the apparatus 20, such as, for example, the speed of the motor and as a result the speed of movement of the towing apparatus 20 across the ground surface. Other functions of the towing apparatus may also be controlled as desired.

The system 10 may also include a central anchor device 50 which is configured to define a fixed anchor point with respect to the ground surface on which the system is utilized and operated. The central anchor device 50 may be removably mountable on the ground surface to provide a secure anchor point that may be moved from location to location on the ground surface. In the illustrative embodiments, the anchor device 50 may include a center assembly 52 for securing to the fixed point on the ground surface. The center assembly 52 may further include a base 54 which may have an upstanding post 56 which may be generally oriented substantially perpendicular to the ground surface. The base may also include a plurality of arms 58, 59 which radiate outwardly from the bottom of the upstanding post 56 in a plane parallel to the ground surface. Illustratively four of the arms are utilized although more or less could also be employed. Each of the arms 58, 59 may have at least one aperture 60 formed therein, such as at the outer ends of the arms. The center assembly 52 may also include a rotor 62 which is rotatably mounted on the base, and more specifically on the upstanding post 56. The rotor 62 may form a loop 64 which is able to be rotated about the post. Typically, the rotor 62 rotates freely on the upstanding post of the base to rotate with respect to the ground surface on which the assembly 52 is mounted. The central anchor device 50 may also include an anchoring structure 66 which is configured to anchor the center assembly on the ground surface. The anchoring structure 66 may include at least one ground stake 68 for each of the arms of the center assembly and each stake may be passed through the respective aperture 60 of the arm and into the ground surface.

The system 10 may also include an elongated guide member 70 which is securable at a first end 72 to the central anchor device, such as to the loop 64 of the rotor of the center assembly, such that the elongated member guide member is able to rotate about the post without substantial interference. The guide member 70 may also include a second end 74 located opposite of the first end which is securable to the attachment point 30 on the towing apparatus 20 such that the towing apparatus is effectively attached to the central anchor device 50, which causes forward movement of the towing apparatus to be along a substantially circular path in a plane oriented parallel to the ground. The guide member 70 may be suitably flexible and inextensible or un-stretchable to effectively produce the circular movement of the towing apparatus centered on the central anchor device. Illustratively, the guide member 70 may be formed of a length of chain, a length of cable, a length of rope, etc.

In some implementations, a length of chain may be preferable due to the durability of the chain while being dragged across the ground surface and the weight of the chain holding the guide member relatively close to the ground.

The system 10 may further include a turning device 80 which is configured to engage the elongated guide member 70 in a manner that causes the towing apparatus 20 to turn or execute a turn while moving forwardly across the ground surface and being tethered to the central anchor device by the guide member. The turning device 80 may cause the towing apparatus (and the towed roping practice apparatus) to turn at an angle of approximately 60 degrees to approximately 90 degrees from the (tangent) line of movement of the towing apparatus just prior to the engagement of the guide member with the turning device. The turning device 80 may rest upon the ground surface and may be mounted or otherwise secured to the ground surface to maintain its position even as the guide member contacts and engages the device 80. The turning device may be positioned radially outwardly from the central anchor device 50 but inwardly from the circular path defined by the movement of the towing apparatus as the forward movement of the towing apparatus is guided by the guide member.

In general, the relatively closer the turning device is positioned to the central anchor device, the relatively less the movement of the towing apparatus will deviate from the circular path (e.g. a relatively smaller turn angle). Conversely, the relatively closer the turning device is positioned to the circular path (and away from the anchor device), the relatively more the movement of the towing apparatus will deviate from the circular path (e.g. a relatively larger turn angle).

The turning device 80 may include a turning portion 82 which is configured to cause or at least initiate the turn of the towing apparatus when the turning portion is engaged by the guide member 70. The turning portion 82 may have a turning contact surface 84 which is contacted by the guide member, and is typically the initial surface of the turning device contacted by the guide member. In some embodiments, the turning portion is configured so that the turning contact surface is oriented substantially perpendicular to the ground surface when the turning device rests upon the ground surface although it should be recognized that absolute perpendicularity is not required and some degree of deviation from the perpendicular may be utilized.

The turning device 80 may also include a release portion 88 which is generally configured to release the guide member 70, or cause the release of the guide member, from the turning device as the towing apparatus 20 continues moving forward after the guide member has initially contacted the turning portion. The release portion 88 may be generally configured to cause the guide member to rise up with respect to the ground surface as the towing apparatus continues to pull on the guide member and ultimately raise the guide member sufficiently that the guide member slips free of contact with the turning device. The release portion 88 may have a release contact surface 90 which is contacted by the guide member, and in some embodiments the release contact surface is inclined with respect to the ground surface. The release contact surface may be oriented at a release angle with respect to the ground that is suitable to cause the guide member under tension to be raised up with respect to the ground surface and eventually slip over the turning device. In some embodiments, the release angle $\alpha$ may measure approximately 30 degrees to approximately 60 degrees with respect to the ground surface on which the device 80 rests, and in some further embodiments the release angle $\alpha$ measures approximately 40 degrees to approximately 50 degrees. Finally, in some embodiments, the release angle has a measure of approximately 45 degrees.

For highly effective operation, the turning contact surface 84 of the turning portion and the release contact surface 90 of the release portion may both be positioned on a line radiating from the central anchor device, although other orientations of the device 80 may be utilized. In operation, forward movement of the towing apparatus moves the guide member across (and closely adjacent to) the ground surface until the guide member initially contacts the turning contact surface 84 which effectively shortens the radius of the portion of the guide member acting upon the towing apparatus. This effective shortening of the radius of the guide member causes the towing apparatus to effectively begin to turn more sharply inward toward the central anchor device than continuing on the circular path. The turning of the towing apparatus along this relatively shorter radius continues as the guide member contacts the release contact surface 90. As the turning towing apparatus continues its forward movement, the tension in the guide member and the inclination of the release contact surface tends to cause the guide member to slide upwardly on the release contact surface until the guide member reaches the uppermost point of the release contact surface, at which point the guide member is effectively released or freed from the influence of the turning device. As the towing apparatus is now moving along a path within the circular path, the guide member is loose or slack and does not influence the movement of the towing apparatus until the towing apparatus reaches the circular path and tension in the guide member is restored, causing the towing apparatus to follow the circular path once again. As the towing apparatus typically lacks any steering and thus follows a straight path when not otherwise being influenced by tension in the guide member, the towing apparatus (and the towed practice apparatus 12) will usually follow a substantially straight path after the turn is executed and until the towing apparatus crosses the circular path.

In some embodiments, the turning device 80 may also include a transition portion 94 which is generally configured to separate the release portion 88 from the turning portion 82, and may have a transition contact surface 96. In some embodiments, the transition contact surface 96 may be oriented substantially parallel to the ground surface although other orientations may be used. The turning device 80 may also include at least one securing portion 100 which is configured to receive at least one ground spike 102 which is effective to fasten the turning device 80 to the ground surface.

An anchor aperture 104 may be formed in each of the securing portions to receive one of the ground spikes 102. The securing portions 100 may have a variety of different configurations that are suitable to secure the turning device to the ground surface and hold the turning device in position as the guide member engages and releases from the turning device 80.

Suitably, the height of the turning device, the height of the rotor 62 of the central anchor device, and the relative weight of the guide member should be suitably selected so that the guide member is engaged and then released by the turning device as the towing apparatus moves around the central anchor device. In some illustrative embodiments, the turning device 80 may have a height above the ground surface of approximately 10 inches to approximately 14 inches, and the rotor of the central anchor device is approximately 4 inches to approximately 10 inches above the ground surface.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system for practicing roping of a steer, comprising:
   a towing apparatus configured to tow a steer roping practice apparatus across a ground surface;
   a central anchor device configured to define a fixed anchor point with respect to the ground surface;
   an elongated guide member attachable at a first end to the central anchor device and attachable at a second end to the towing apparatus to guide the towing apparatus along a circular path about the central anchor device when the elongated guide member is in tension;
   a turning device configured to engage the elongated guide member between the central anchor device and the towing apparatus in a manner causing the towing apparatus to make an initial turn on the ground surface from the circular path of the towing apparatus to a straight path for the towing apparatus extending along a chord of a circle defined by the circular path; and
   wherein the turning device is further configured to release the elongated guide member to permit the towing apparatus to continue movement along the straight path when the elongated guide member is slack and make a subsequent turn from the straight path back onto the circular path when tension is restored to the elongated guide member;
   wherein the turning device includes
   a turning portion configured to cause the initial turn of the towing apparatus when engaged by the guide member; and
   a release portion configured to release the guide member from the turning device as the towing apparatus makes the initial turn;
   wherein the release portion forms a release contact surface on the turning device, the release contact surface being oriented at an incline with respect to the ground surface when the turning device is rested upon the ground surface.

2. The system of claim 1 additionally comprising a mechanical steer roping practice apparatus movable across the ground surface and removably hitched to the towing apparatus.

3. The system of claim 1 wherein the turning device is mountable on the ground surface.

4. The system of claim 1 wherein the turning portion forms a turning contact surface on the turning device, the turning contact surface being oriented substantially vertically with respect to the ground surface when the turning device is rested upon the ground surface.

5. The system of claim 1 wherein the release contact surface is oriented at a release angle with respect to the ground surface when the turning device is rested upon the ground surface, the release angle being effective to release the elongated guide member from the turning device when the elongated guide member engages the release contact surface on the turning device.

6. The system of claim 5 wherein the release angle having a measure of approximately 30 degrees to approximately 60 degrees.

7. The system of claim 1 wherein the turning device includes at least one securing portion configured to receive at least one ground spike effective to fasten the turning device to the ground surface.

8. The system of claim 1 wherein the elongated guide member is flexible.

9. The system of claim 8 wherein the elongated guide member is substantially inextensible.

10. The system of claim 1 wherein the towing apparatus comprises:
    a frame having an attachment point configured to attach to the elongated guide member;
    at least a pair of wheels rotatably mounted on the frame; and
    a motor mounted on the frame and connected to the wheels to produce rotation of the wheels and movement of the towing apparatus across the ground surface.

11. The system of claim 10 wherein the towing apparatus further comprises:
    a control apparatus on the frame and configured to control operation of the motor, the control apparatus being responsive to a remote control.

12. The system of claim 1 wherein the inclined release contact surface is straight from a location on the turning device adjacent to the ground surface to an uppermost location on the turning device.

13. A system for practicing roping of a steer, comprising:
    a mechanical steer roping practice apparatus movable across a ground surface;
    a towing apparatus configured to tow the steer roping practice apparatus across the ground surface, the steer roping practice apparatus being removably hitched to the towing apparatus, the towing apparatus comprising:
    a frame having an attachment point;

at least a pair of wheels rotatably mounted on the frame; and a motor mounted on the frame and connected to the wheels to produce rotation of the wheels and movement of the towing apparatus across the ground surface;

a central anchor device configured to define a fixed anchor point with respect to the ground surface;

a flexible elongated guide member attachable at a first end to the central anchor device and attachable at a second end to the attachment point on the towing apparatus to guide the towing apparatus along a circular path about the central anchor device when the elongated guide member is in tension, the elongated guide member having a fixed length between the central anchor device and the towing apparatus; and a turning device configured to engage the elongated guide member between the central anchor device and the towing apparatus in a manner causing the towing apparatus and the steer roping practice apparatus to make an initial turn on the ground surface from the circular path;

wherein the turning device is further configured to release the elongated guide member to permit the towing apparatus and the steer roping practice apparatus to continue movement along a straight path when the elongated guide member is slack and make a subsequent turn from the straight path back onto the circular path when tension is restored to the elongated guide member, the turning device including a release contact surface to release the guide member from the turning device, the release contact surface being oriented at an incline with respect to the ground surface when the turning device is rested upon the ground surface, the inclined release contact surface being straight from a location on the turning device adjacent to the ground surface to an uppermost location on the turning device.

14. The system of claim 13 wherein the turning device includes a turning portion configured to cause the initial turn of the towing apparatus when engaged by the guide member.

15. The system of claim 14 wherein the turning portion forms a turning contact surface on the turning device, the turning contact surface being oriented substantially vertically with respect to the ground surface when the turning device is rested upon the ground surface.

16. The system of claim 13 wherein the release contact surface is oriented at a release angle with respect to the ground surface when the turning device is rested upon the ground surface, the release angle being effective to release the elongated guide member from the turning device when the elongated guide member engages the release contact surface on the turning device.

17. The system of claim 13 wherein the elongated guide member is substantially inextensible.

18. In a system for practicing roping of a steer in which the system comprises a mechanical steer roping practice apparatus movable across a ground surface, a towing apparatus configured to tow the steer roping practice apparatus across the ground surface, a central anchor device configured to define a fixed anchor point with respect to the ground surface, and a flexible elongated guide member attached at a first end to the central anchor device and attached at a second end to the attachment point on the towing apparatus to guide the towing apparatus along a circular path about the central anchor device when the elongated guide member is in tension, with the elongated guide member having a fixed length between the central anchor device and the towing apparatus, the system comprising:

a turning device configured to engage the elongated guide member between the central anchor device and the towing apparatus in a manner causing the towing apparatus and the steer roping practice apparatus to make an initial turn on the ground surface from the circular path;

wherein the turning device is further configured to release the elongated guide member to permit the towing apparatus and the steer roping practice apparatus to continue movement along a straight path when the elongated guide member is slack and make a subsequent turn from the straight path back onto the circular path when tension is restored to the elongated guide member;

wherein the turning device includes:

a turning portion configured to cause the initial turn of the towing apparatus when engaged by the guide member, the turning portion forming a turning contact surface on the turning device, the turning contact surface being oriented substantially vertically with respect to the ground surface when the turning device is rested upon the ground surface; and a release portion configured to release the guide member from the turning device as the towing apparatus makes the initial turn, the release portion forming a release contact surface on the turning device, the release contact surface being oriented at an incline with respect to the ground surface when the turning device is rested upon the ground surface, the inclined release contact surface being straight from a location on the turning device adjacent to the ground surface to an uppermost location on the turning device.

* * * * *